United States Patent [19]

Marr

[11] Patent Number: 5,725,649
[45] Date of Patent: Mar. 10, 1998

[54] PIGMENT COMPOSITIONS

[75] Inventor: Alastair McAlpine Marr, Paisley, Scotland

[73] Assignee: Ciba Specialty Chemicals Corporation, Tarrytown, N.Y.

[21] Appl. No.: 699,958

[22] Filed: Aug. 20, 1996

[51] Int. Cl.$^6$ .................................................... C09B 67/50
[52] U.S. Cl. ............................................ 106/411; 106/410
[58] Field of Search .................... 106/411, 410, 106/413

[56] References Cited

U.S. PATENT DOCUMENTS 4,726,847  2/1988  Wanser ................... 106/308 N

FOREIGN PATENT DOCUMENTS 0621319  10/1994  European Pat. Off. .
0638615   2/1995  European Pat. Off. .
1546950   5/1979  United Kingdom .

OTHER PUBLICATIONS

Derwent Abst. 82–16611E (Jan. 21, 1982).
1994 McCutcheon's vol. 1: Emulsifiers & Detergents North American Edition, p. 71.

*Primary Examiner*—Deborah Jones
*Attorney, Agent, or Firm*—Kevin T. Mansfield; Michele A. Kovaleski

[57] ABSTRACT

The present invention provides a composition comprising copper phthalocyanine containing 0–4 chlorine atoms having a crystal size in the range of from 0.01 to 0.2 μm, and from 10 to 15% by weight of an ionic complex formed from copper phthalocyanine sulphonic acid and a quaternary amine of the formula (I)

$$\overset{+}{N}(R_1R_2R_3R_4)X^- \quad (I)$$

where $R_1$ is a $C_1$–$C_6$ alkyl group; $R_2$ is a $C_1$–$C_{18}$ alkyl group; $R_3$ is the same as $R_2$ or is a hydroxyethyl or ethoxylated ethyl group having up to 5 ethyleneoxy units; $R_4$ is a hydroxyethyl or ethoxylated ethyl group having up to 5 ethyleneoxy units; and X is a halogen atom.

20 Claims, No Drawings

PIGMENT COMPOSITIONS

The present invention relates to pigment compositions containing chlorinated copper phthalocyanine containing from 0–4 chlorine atoms.

Accordingly the present invention provides a composition comprising copper phthalocyanine containing 0–4 chlorine atoms having a crystal size in the range of from 0.01 to 0.2 µm, and from 10 to 15% by weight of an ionic complex formed from copper phthalocyanine sulphonic acid and a quaternary ammonium halide of the formula (I)

where $R_1$ is a $C_1$–$C_6$ alkyl group; $R_2$ is a $C_1$–$C_{18}$ alkyl group; $R_3$ is the same as $R_2$ or is a hydroxyethyl or ethoxylated ethyl group having up to 5 ethyleneoxy units: $R_4$ is a hydroxyethyl or ethoxylated ethyl group having up to 5 ethyleneoxy units; and X is a halogen atom.

The copper phthalocyanine contains 0–4 chlorine atoms which may be covalently bonded, but is preferably trichlorinated copper phthalocyanine.

The copper phthalocyanine preferably has a crystal size of from 0.03 to 0.08 µm.

The group $R_1$ in formula (I) may be methyl, ethyl, propyl, butyl, aryl or hexyl but is preferably methyl.

The group $R_2$ may be the same as $R_1$ but is preferably a higher alkyl group having 12 to 18 carbon atoms such as cocoalkyl, tallow alkyl, stearyl or oleyl.

$R_3$ may be the same as $R_2$ but is preferably the same as $R_4$. $R_3$ and $R_4$ may be a hydroxy terminated ethoxylated ethyl group having 1 to 5 ethylene oxy units but are preferably hydroxyethyl.

As halogen X may be fluorine, chlorine, bromine or iodine, but is preferably chlorine.

The copper phthalocyanine sulphonic acid preferably has a degree of substitution of 0.8 to 1.5 preferably about 1.

The composition may also contain up to 10% by weight, preferably about 5%, of a resin as its aluminum salt.

Suitable resins include all rosin acids and their derivatives.

The composition may be produced by treating copper phthalocyanine having a crystal size in the range of from 0.01 to 0.2 microns with the ionic complex.

The ionic complex may be prepared separately and then added to the copper phthalocyanine, or it may be prepared in situ, whereby the copper phthalocyanine is treated with copper phthalocyanine sulphonic acid at an alkaline pH in aqueous slurry followed by the addition of the quaternary amine of formula (I).

When an aluminum resinate is present, this is usually added as a final step in preparing the composition.

The copper phthalocyanine may be prepared by any conventional route such as acid pasting or ballmilling with salt, followed by treating the pigment as an aqueous slurry at elevated temperatures with an organic solvent which is at least partially undissolved in the water. It is the solvent treatment which ensures the correct particle size.

The organic solvent may be a water immiscible ester such as a lower alkyl ester of an aromatic carboxylic acid, e.g. an alkyl benzoate, preferably methyl benzoate. The water immiscible solvent is preferably in the form of an emulsion, e.g. a 50% emulsion in water as this allows for the use of less solvent than is otherwise needed, a reduction of 20 to 40 times being possible.

If an at least partially water soluble solvent is used such as an alcohol, e.g. propanol, butanol or n-pentanol, it may be further salted out with a base such as sodium hydroxide. A phase transfer catalyst such as benzyl tributyl ammonium chloride is preferably used to facilitate interaction with the pigment. A water miscible polyglycol, preferably polyethylene glycol may also be used as the solvent.

The amount of solvent used need only be up to 30% by weight based on the weight of pigment, preferably 5 to 20% by weight.

The pigment may be treated with the solvent for 1 to 20 hours at 70° to 95° C., preferably 4 to 8 hours at 90° to 95° C.

If an ester is used as the solvent it may be removed by hydrolysis using an aqueous base e.g. sodium or potassium hydroxide. The treated pigment is then further treated with the ionic complex.

A preferred process for making the product of the invention comprises preparing the copper phthalocyanine and subjecting it to acid pasting, treating the resulting pigment with 5 to 20% by weight of an aqueous emulsion of methyl benzoate for 4 to 8 hours at 90° to 95° C., removing the methyl benzoate by hydrolysis with sodium hydroxide, adding 5 to 10% of copper phthalocyanine sulphonic acid at alkaline pH in aqueous slurry followed by addition of a quaternary ammonium halide of formula (I) and then treating the product with aluminum resinate.

The product of the invention has good compatibility with both waterborne and solvent borne automotive paint systems. It gives good millbase rheology and an attractive green down flop at low hue angle in metallic paints.

The invention is illustrated by the following Examples.

EXAMPLE 1

100 g of trichlorinated copper phthalocyanine blue crude are dissolved in 14 parts by weight of 98% Sulphuric Acid at 80–85 centigrade. After two hours stirring the 'paste' is added to water under conditions of high flow and high turbulence. The pigmentary product is isolated as a filtercake, with median crystal size of about 0.05 µm lying within a narrow range.

100 g of the above pigment is purified with excess sodium hydroxide at 90° C. then treated as an aqueous slurry at 5–7% solids in water and at pH7–7.5 with 10% (by weight of pigment) of methyl benzoate, admixed to the slurry by high shear dispersion. The ester is added in the form of a stable emulsion in water. The resultant slurry is held at 90°–94° C. for 8 hours. The ester is then hydrolysed in situ by addition of sodium hydroxide.

The product is again isolated as a filtercake.

100 g of the above treated material is dispersed in water to give a slurry of 5–7% solids.

8 g of CuPcSOaH is dispersed through the slurry at a pH of 11–11.5.

5% of Ethoquad O/12 (9-Octadecen-1-aluminium, N, N-bis (2-hydroxyethyl)-N-methyl, chloride) as an aqueous solution, then 7% Arquad 2C) (Di-coco, dimethyl (ammonium chloride) as an aqueous suspension are stirred through the slurry. 5% of tall oil rosin soap solution is mixed through the slurry then a molar equivalent addition of aluminum chloride on resin is finally added before isolation of the product by filtration, washing and drying.

The resulting pigment shows excellent colour strength, gloss, transparency and millbase rheology as well as neutral green fliptone in solvent borne automotive paints. The product is also highly dispersible in waterborne automotive paints.

EXAMPLE 2

The procedure of Example I is repeated except that the methyl benzoate emulsion step was replaced by the following.

To the slurry was added at pH>10.0, 30% Pentanol and 3% water soluble phase transfer catalyst (Benzyltributylammonium chloride). The resultant slurry is refluxed for 6 hours before distillation of the solvent. The product is finished in situ as in Example I.

EXAMPLE 3

100 g of trichlorinated copper phthalocyanine blue crude is treated with 98% Sulphuric Acid as per Example 1.

The filtercake is slurried in water and the pH is adjusted to 7.0–7.5 with sodium hydroxide, with 10% (by weight of pigment) of methyl benzoate added in the form of a stable emulsion in water. After heating for 4 hours at 90° C. the methyl benzoate is hydrolysed by the addition of sodium hydroxide.

After hydrolysis is complete 8 g of $CuPcSO_3H$ is dispersed through the slurry, and the pH is adjusted to 11–11.5. 5% of Ethoquad O/12 as an aqueous solution, then 7% Arquad 2C as an aqueous suspension are stirred through the slurry.

5% of tall oil resin soap solution is mixed through the slurry then a molar equivalent addition of aluminum chloride on resin is finally added before adjusting the pH to 10.5–11.5. Filtration and washing with hot water (60° C.) is then carried out and the product is dried.

EXAMPLE 4

13 g of $CuPcSO_3H$ is dispersed in water at 60° C. The pH is raised to 11–11.5 with sodium hydroxide, and 12 g of Ethoquad C12. (Coco, N,N,bis(2-hydroxyethyl)N-methyl ammonium chloride) as an aqueous solution is added. After stirring for 2 hours the product is filtered and washed and isolated as a filtercake of the ionic complex.

100 g of trichlorinated copper phthalocyanine blue crude is treated with 98% Sulphuric Acid as per Example 1.

The resultant filtercake is slurried in water and the pH is adjusted to 7.0–7.5 with Sodium hydroxide, with 10% (by weight of pigment) of methyl benzoate added in the form of a stable emulsion in water. After heating for 4 hours at 90° C. the methyl benzoate is hydrolysed by the addition of Sodium hydroxide.

After hydrolysis is complete 15 g (dry weight) of the ionic complex filtercake is mixed through the slurry, 5% tall oil rosin soap solution is mixed through the slurry then a molar equivalent addition of aluminum chloride on resin is finally added before finishing the process as per Example 3.

EXAMPLE 5

44 g of Crude copper phthalocyanine with a chlorine content of 4.5% is ballmilled for 7 hours with 122 g of Calcium Chloride. The resulting material is then slurried in an aqueous solution containing 5% Hydrochloric acid and stirred for 1 hour. The slurry is then filtered and washed to remove the salt, and the product isolated as a filtercake. The particle size is in the range of 0.05–0.1 μm.

40 g of the above pigment is slurried in water and the pH adjusted to 7.0–7.5. 10% (by weight of pigment) of methyl benzoate is added in the form of a stable emulsion in water. After heating for 4 hours at 90° C. the methyl benzoate is hydrolysed by the addition of sodium hydroxide.

After hydrolysis is complete 3.6 g of $CuPcSO_3H$ is dispersed through the slurry, and the pH adjusted to 11–11.5. 9% of Noramox S5, 5% of tall oil rosin soap solution is mixed through the slurry then a molar equivalent addition of aluminum chloride on resin is finally added before finishing the process as per Example 3.

I claim:

1. A composition comprising copper phthalocyanine containing from 0–4 chlorine atoms having a crystal size in the range of from 0.01 to 0.2 μm, and from 10 to 15% by weight of an ionic complex formed from copper phthalocyanine sulphonic acid and a quaternary amine of the formula (I)

where $R_1$ is a $C_1$–$C_6$ alkyl group; $R_2$ is a $C_1$–$C_{18}$ alkyl group; $R_3$ is the same as $R_2$ or is a hydroxyethyl or ethoxylated ethyl group having up to 5 ethyleneoxy units; $R_4$ is a hydroxyethyl or ethoxylated ethyl group having up to 5 ethyleneoxy units; and X is a halogen atom.

2. A composition as claimed in claim 1 in which the copper phthalocyanine is trichlorinated copper phthalocyanine.

3. A composition as claimed in claim 1 in which the crystal size is in the range of from 0.03 to 0.08 μm.

4. A compositon as claimed in claim 1 in which $R_1$ is a methyl group.

5. A composition as claimed in claim 1 in which $R_2$ is a higher alkyl group having 12 to 18 carbon atoms.

6. A composition as claimed in claim 1 in which $R_3$ and $R_4$ are both hydroxyethyl.

7. A composition as claimed in claim 1 in which X is chlorine.

8. A composition as claimed in claim 1 in which the copper phthalocyanine sulphonic acid has a degree of substitution of 0.8 to 1.5.

9. A composition as claimed in claim 1 which also contains up to 10% by weight of a resin as its aluminum salt.

10. A process for preparing a composition comprising copper phthalocyanine containing from 0–4 chlorine atoms having a crystal size in the range of from 0.01 to 0.2 μm, and from 10 to 15% by weight of an ionic complex formed from copper phthalocyanine sulphonic acid and a quaternary ammonium halide of the formula (I)

where $R_1$ is a $C_1$–$C_6$ alkyl group, $R_2$ is a $C_1$–$C_{18}$ alkyl group, $R_3$ is the same as $R_4$ or is a hydroxyethyl or ethoxylated ethyl group having up to 5 ethyleneoxy units, $R_4$ is a hydroxyethyl or ethoxylated ethyl group having up to 5 ethyleneoxy units and X is a halogen atom, which comprises treating the copper phthalocyanine having a particle size in the range of from 0.01 to 0.2 μm with the ionic complex.

11. A process according to claim 10 which comprises treating the copper phthalocyanine having a particle size in the range of from 0.01 to 0.2 microns with copper phthalocyanine sulphonic acid at an alkaline pH in aqueous slurry followed by the addition of the quaternary ammonium halide of formula (1), whereby the ionic complex is formed in situ.

12. A process as claimed in claim 10 in which the copper phthalocyanine is obtained by acid pasting or ballmilling with salt and then treating the pigment as an aqueous slurry at elevated temperatures with an organic solvent which is at least partially undissolved in the water.

13. A process as claimed in claim 12 in which the organic solvent is a lower alkyl ester of an aromatic carboxylic acid, an alcohol or a polyglycol.

14. A process as claimed in claim 13 in which the solvent is methyl benzoate as a 50% emulsion in water.

15. A process as claimed in claim 13 in which the solvent is n-pentanol which is at least partially salted out with a base.

16. A process as claimed in claim 12 in which the amount of solvent is up to 30% by weight based on the weight of pigment.

17. A process as claimed in claim 12 in which the pigment is treated with the solvent for 1 to 20 hours at 70° to 95° C.

18. A process as claimed in claim 10 in which the resulting composition is treated with up to 10% by weight, based on the weight of pigment, of a resin as its aluminium salt.

19. A waterborne or solvent borne automotive paint system containing a composition comprising copper phthalocyanine containing from 0–4 chlorine atoms having a crystal size in the range of from 0.01 to 0.2 μm, and from 10 to 15% by weight of an ionic complex formed from copper phthalocyanine sulphonic acid and a quaternary ammonium halide of the formula (I)

$$\overset{+}{N}(R_1R_2R_3R_4)X^- \qquad (I)$$

Where $R_1$ is a $C_1$–$C_6$ alkyl group, $R_2$ is a $C_1$–$C_{18}$ alkyl group, $R_3$ is the same as $R_2$ or is a hydroxyethyl or ethoxylated ethyl group having up to 5 ethyleneoxy units, $R_4$ is a hydroxyethyl or ethoxylated ethyl group having up to 5 ethyleneoxy units and X is a halogen atom.

20. A paint system as claimed in claim 19 which is waterborne.

* * * * *